Figure 1:
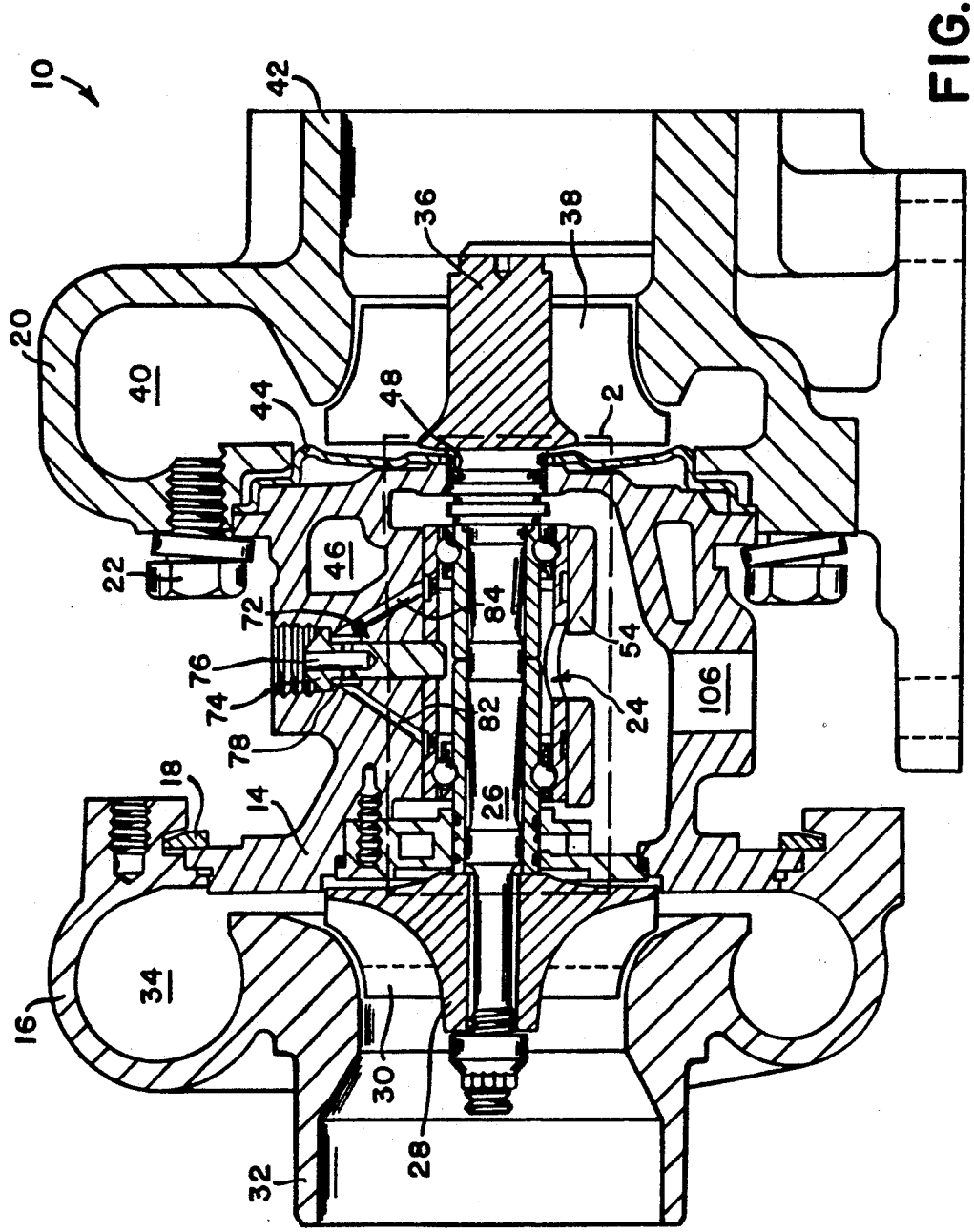

United States Patent [19]

Gutknecht

[11] Patent Number: 5,076,766
[45] Date of Patent: Dec. 31, 1991

[54] TURBOCHARGER BEARING RETENTION AND LUBRICATION SYSTEM

[75] Inventor: Daniel A. Gutknecht, Torrance, Calif.

[73] Assignee: Allied-Signal Inc., Morristown, N.J.

[21] Appl. No.: 449,279

[22] Filed: Dec. 12, 1989

[51] Int. Cl.⁵ ............................................. F04B 17/00
[52] U.S. Cl. .................................. 417/407; 184/6.11; 384/906
[58] Field of Search ....................... 417/407, 408, 409; 384/99, 906, 535, 493, 277, 278, 476, 585, 512, 506; 184/6.11

[56] References Cited

U.S. PATENT DOCUMENTS

| | | | |
|---|---|---|---|
| 2,854,296 | 9/1958 | Eberle et al. ....................... | 384/476 |
| 3,811,741 | 5/1974 | McInerney et al. . | |
| 4,527,912 | 7/1985 | Klusman ............................. | 384/99 |
| 4,708,602 | 11/1987 | McEachern, Jr. et al. ........ | 417/407 |
| 4,721,441 | 1/1988 | Miyashita et al. .................. | 417/407 |
| 4,738,548 | 4/1988 | Zloch et al. ......................... | 384/99 |
| 4,789,253 | 12/1988 | Perego ................................. | 384/99 |
| 4,798,523 | 1/1989 | Glaser et al. . | |
| 4,943,170 | 7/1990 | Arda ................................... | 417/407 |

FOREIGN PATENT DOCUMENTS 0230885 8/1987 European Pat. Off. .
0272151 6/1988 European Pat. Off. .
1425025 12/1968 Fed. Rep. of Germany .
1526439 2/1970 Fed. Rep. of Germany .
3825326 2/1990 Fed. Rep. of Germany .
2449820 9/1990 France .

Primary Examiner—Richard A. Bertsch
Assistant Examiner—Timothy S. Thorpe
Attorney, Agent, or Firm—Ken C. Decker; William N. Antonis

[57] ABSTRACT

A turbocharger includes a rotating shaft which is supported within the turbocharger center housing by rotational bearing elements. The bearing cartridge is located axially within the housing 14 by a pin which extends through orifices drilled in the center housing and in the bearing outer ring. The pin is relatively smooth, so that excursions of the bearing cartridge assembly with the shaft is permitted when the shaft is accelerated through critical rotational speeds. These excursions are damped by lubricating fluid communicated into grooves circumscribing the bearing outer ring through lubrication passages extending through the pin. The lubricating fluid in the grooves communicates into the intersticial space defined between the outer ring of the bearing cartridge assembly and the center housing to thereby dampen the excursions of the bearing cartridge assembly.

12 Claims, 2 Drawing Sheets

TURBOCHARGER BEARING RETENTION AND LUBRICATION SYSTEM

This invention relates to a bearing retention and lubrication system for an exhaust gas driven turbocharger.

Turbochargers include a compressor wheel and a turbine wheel mounted on opposite ends of a shaft supported within a housing by bearings. In order to improve response time, it has been proposed, for example, in U.S. Pat. No. 4,798,523, to support the shaft for rotation relative to the turbocharger housing by ball bearings instead of the more conventional journal bearings. However, it is necessary for proper operating efficiency of the turbocharger that the shaft be mounted within the turbocharger housing accurately. Heretofore, turbochargers in which the shaft is supported by ball bearings have provided a cartridge bearing assembly which is located within the housing by a threaded connection or by stops. Since it is necessary to permit shaft excursions when the rotational speed of the shaft passes through critical frequencies, the shaft must be permitted some freedom of movement. In order to damp these shaft excursions, it has been proposed to use lubricating fluid, such as engine lubricating oil, to both lubricate the ball bearings and also to provide a film of fluid between the cartridge and the housing which acts as a damper to damp excursions of the shaft when the latter passes through critical rotational frequencies.

The present invention assures accurate positioning of the shaft by using a pin which is received in coaxial apertures in the housing and in the outer ring of the bearing cartridge. Since apertures or holes are inherently more accurate to locate than are stops or threads, the pin accurately locates the bearing cartridge, and therefore the shaft, within the turbocharger housing. The pin also permits movement of the bearing cartridge along the axis of the pin to accommodate shaft excursions when the rotational speed of the shaft passes through critical frequencies. The pin is provided with lubricating passages, which are connected to the lubrication conduit through a conventional fitting on the end of the pin accessible from the exterior of the housing. Cooperating lubricating passages within the housing communicate the lubrication passages within the pin to circumferentially extending grooves which circumscribe the outer ring of the bearing assembly adjacent each of the circumferentially spaced bearing elements near opposite ends of the cartridge. Feed holes squirt lubricating fluid communicated into the grooves onto the bearing elements, thereby assuring proper lubrication of the bearing elements with a minimum of lubricating fluid. The groove on the outer surface of the outer bearing ring also feeds the aforementioned viscous damping surfaces between the bearing outer ring and the housing, to thereby dampen the aforementioned shaft excursions when the shaft passes through critical frequencies.

Figure 2:
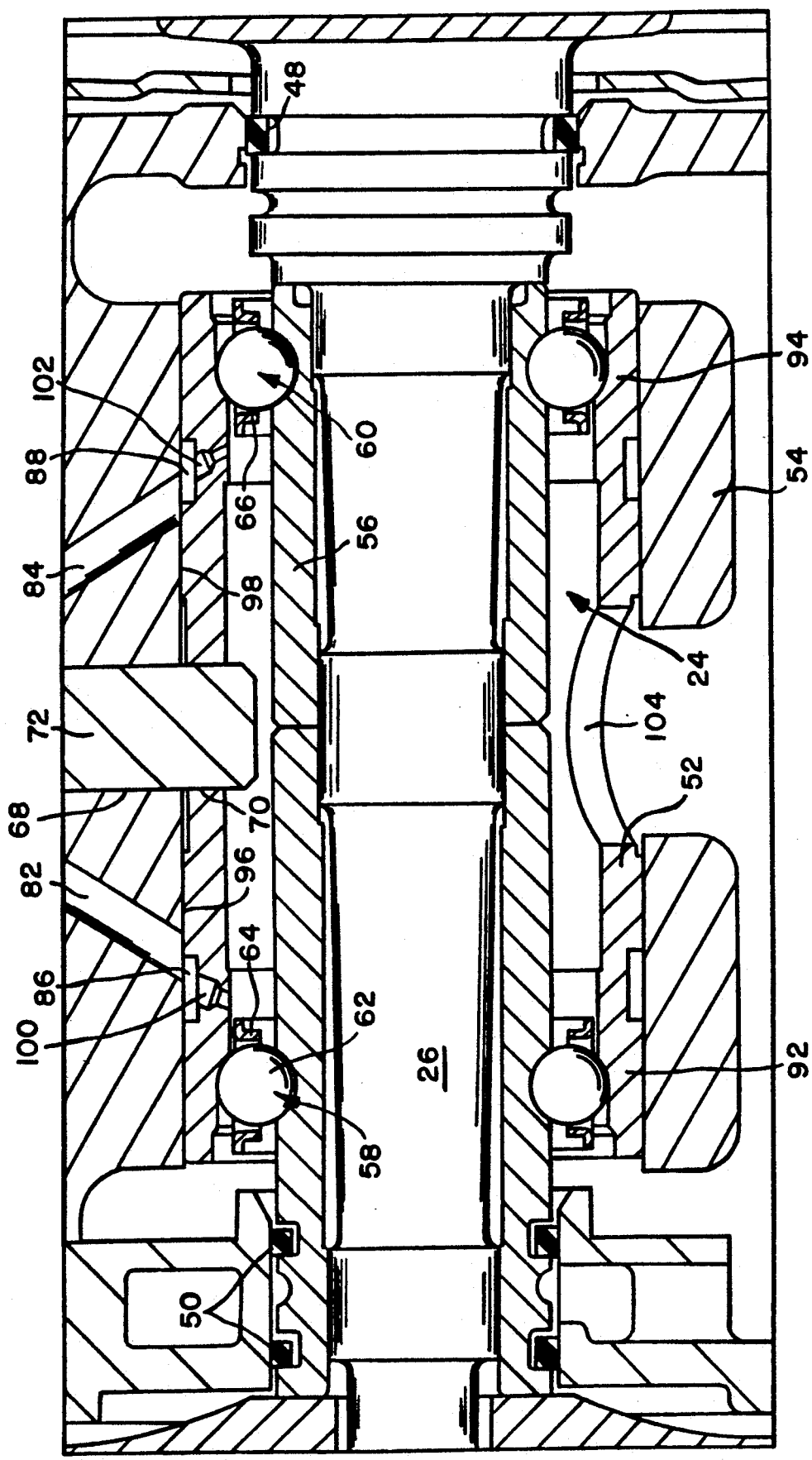

These and other features of the invention will become apparent from the following description, with reference to the accompanying drawing, in which:

FIG. 1 is a longitudinal cross-sectional view of an exhaust gas driven turbocharger made pursuant to the teaching of the present invention; and FIG. 2 is an enlarged view of the circumscribed portion of FIG. 1.

Referring now to the drawings, and exhaust gas driven turbocharger indicated by the numeral 10 includes a center housing 14, a compressor housing 16 secured to one end of the center housing 14 by retaining ring 18, and a turbine housing 20 secured to the opposite end of the center housing 14 by bolts 22. A bearing cartridge assembly generally indicated by the numeral 24 mounts a shaft 26 for rotation relative to the center housing 14. Opposite ends of the shaft 26 project into the compressor housing 16 and turbine housing 20 respectively.

A compressor wheel 28 is mounted on the end of the shaft 26 which extends into the compressor housing 16. Compressor wheel 28 is provided with vanes 30 which upon rotation of the compressor wheel 28, compress air drawn into the inlet 32 to create a pressure level in outlet volute 34 which is higher than the pressure level at the inlet 32. The compressed air in volute 34 is communicated to the induction manifold of the engine upon which the turbocharger 10 is mounted.

A turbine wheel 36 is mounted on the opposite end of the shaft 26 and includes turbine blades 38 which are shaped to respond to exhaust gases communicated from inlet volute 40 to the turbine outlet 42 to cause rotation of the turbine wheel 36. Of course, rotation of turbine wheel 36 also causes rotation of the shaft 26 and the compressor wheel 28 mounted for rotation with the shaft 26. The inlet volute 40 is connected to the exhaust manifold (not shown) of the engine upon which the turbocharger 10 is mounted, and the turbine outlet 42 is connected into the vehicle exhaust system.

A conventional shroud 44 acts as a thermal barrier to at least partially insulate the center housing 14 from the relatively hot exhaust gases within the turbine housing 20. Further thermal protection of the center housing 14 is provided by circulation of engine coolant in the water jacket 46 within the center housing 14, in a manner well known to those skilled in the art. A turbine end seal 48, and compressor end seals 50, prevent escape of lubricating fluid into the turbine housing 20 and compressor housing 16. As will be discussed hereinafter, communication of lubrication fluid into the center housing 14 is necessary to, among other things, provide lubrication of the bearings contained within the bearing cartridge assembly 24.

The bearing carrier 24 includes a bearing outer ring 52 which is received within the bore defined within bearing carrier 54 which is integral with the center housing 14. Bearing assembly 24 further includes a bearing inner ring 56 which is mounted for rotation with the shaft 26. A pair of axially separated sets 58, 60 of roller bearing elements 62 rotatably support the bearing inner ring 56 for rotation relative to the bearing outer ring 52. Bearing retainers 64, 66 maintain the proper position of the roller bearing elements 62.

Center housing 14 and bearing outer ring 52 are provided with coaxial, equal diameter apertures 68, 70 which receive locating pin 72 to properly position the bearing cartridge assembly 24 axially with respect to the center housing 14. Because the clearances between the vanes 30, 38 and the corresponding housings 16, 20 must be held to relatively tight tolerances, it is necessary to locate the shaft 26 relative to the center housing 14 to within a relatively tight axial tolerance. Since the apertures 68, 70 may be drilled at their proper positions within a relatively close tolerance, the pin 72 accurately locates the bearing cartridge assembly 24, and therefore the shaft 26, within the center housing 14. The pin 72 also prevents rotation of the bearing outer ring 52 with respect to the center housing 14.

The end of the pin 72 which is accessible from the exterior of the center housing 14 is provided with a conventional fitting 74, to which a lubrication conduit may be conventionally attached. A first portion 76 of a lubrication passage is provided within the pin 72, and feeds an annular chamber 78 defined between the outer circumferential surface of the pin 72 and the center housing 14, through flow restricting orifices 80. Accordingly, because of the restriction of fluid flow through the orifices 80, the quantity of lubricating fluid utilized to lubricate the bearing elements 60 is minimized. Second portions 82, 84 of the lubrication passage feed circumferentially extending, axially spaced grooves, 86, 88 formed on the outer circumferential surface of the bearing outer ring 52 adjacent the corresponding sets of bearing elements 58, 60. The lubricating oil is communicated from the corresponding grooves 86, 88 into the intersticial space defined between outboard lands 92, 94 of bearing outer ring 52 and the bearing housing 14. Lubricating oil is fed into this intersticial space acts as damper to dampen the excursions of the bearing assembly 24, as will be hereinafter described. Inboard lands 96, 98 closely engage center housing 14. Although some damping does occur between these surfaces and 96, 98, the main purposes of these lands is to resist leakage of lubricating oil out of the grooves 86, 88. One or more feed holes 100 are provided with an orifice through which lubricating fluid in the groove 86 is squirted onto the bearing elements 62 comprising the set 58. A corresponding set of bearing feed holes 102 are provided to squirt lubricating fluid from the groove 88 onto the elements 62 comprising the set 60. By squirting lubricating fluid on the bearing elements 62 in a relatively high velocity, the lubricating fluid required to lubricate the bearing elements 62 is minimized. A drain hole 104 is provided in the outer ring 52 to permit lubricating fluid to drain from the bearing cartridge 24. Lubricating fluid eventually drains through opening 106 into a return line (not shown) connecting the drain opening 106 with the crankcase of the engine upon which the turbocharger 10 is mounted.

As discussed above, one problem with prior art bearing designs was that it was difficult to locate the bearing cartridge assembly 24 with respect to the center housing 12. Accurate location of the bearing cartridge is necessary due to the fact that the shaft 26 must be accurately located in order to maintain proper clearances of the vanes 30, 38 and their associated housing, as discussed above. It is relatively easy to drill holes at accurate locations during manufacturing. Accordingly, the apertures 70, 68 may be drilled relatively accurately, and, accordingly, when the pin 72 is installed, accurate location of the bearing cartridge assembly 24 relative to the housing 14 is assured. The pin 72 also prevents rotation of the outer bearing ring 52. In prior art devices which use stops or threads to locate the bearing assembly, separate devices are necessary to prevent rotation of the outer bearing ring. Because lubricating fluid is fed into the grooves 86, 88 through flow restricting orifices 78, 80, usage of lubricating fluid is minimized. Furthermore, the shape and the fact that the grooves 86, 88 circumscribe the bearing outer race assure proper communication of dampening fluid into the intersticial space defined between the lands 92, 94 and the center housing 14. Accordingly, since the pin 72 is relatively smooth and therefore can permit axial excursions of the bearing cartridge assembly 24 along the axis of the pin, Excursions of the shaft 26 for a very limited distance are permitted when the shaft is accelerated through critical rotational speeds. These excursions are damped by lubricating fluid communicated into the intersticial space between the lands 92, 94 and the housing 14. Although illustrated with respect to a bearing assembly having a solid outer ring and a split inner ring, the invention is also applicable to bearing assemblies having a split outer ring and a solid inner ring, and bearing assemblies in which both the inner and outer rings are solid.

What is claimed is:

1. Exhaust gas driven turbocharger comprising a housing, a shaft within said housing having a longitudinal axis of rotation and a pair of ends, a compressor wheel mounted within said housing on one end of the shaft for rotation therewith, a turbine wheel mounted within said housing on the other end of the shaft for rotation therewith, means for communicating air to said compressor wheel, means for communicating exhaust gas to the turbine wheel to cause the latter to rotate the shaft and the compressor wheel mounted thereon to compress the air communicated to the compressor wheel, and bearing means mounting said shaft for rotation relative to the housing, said bearing means including a bearing outer ring, a bearing inner ring, and ball bearing elements supporting the bearing outer ring on the bearing inner ring, a bearing locating aperture in said bearing outer ring, and an elongated bearing location pin having a longitudinal axis of symmetry extending transversely to said longitudinal axis of the shaft, said pin being carried by said housing and engaging said aperture for locating said bearing assembly in a predetermined position with respect to the housing while permitting movement of said shaft and the bearing assembly along the axis of said pine to accommodate excursions of said shaft when the rotational speed of the shaft passes through critical speed ranges.

2. Exhaust gas driven turbocharger as claimed in claim 1, wherein said housing includes a circumferentially extending wall circumscribing said shaft, said pin extending through said circumferentially extending wall.

3. Exhaust gas driven turbocharger as claimed in claim 2, wherein lubrication passage means extends through said pin to communicate lubricating fluid from outside of said housing to said bearing elements.

4. Exhaust gas driven turbocharger as claimed in claim 3, wherein one end of the pin extends through said wall, said lubrication passage means including a fitting on said one end of the pin for engagement with a lubrication supply line for communicating said lubricating fluid into said passage.

5. Exhaust gas driven turbocharger as claimed in claim 3, wherein said lubrication passage means includes a first portion within said pin, a chamber defined between said pin and said housing, and a second portion extending through the wall of the housing to communicate the chamber with the bearing elements.

6. Exhaust gas driven turbocharger as claimed in claim 5, wherein said lubrication passage means includes a flow restricting orifice between said first portion and said chamber.

7. Exhaust gas driven turbocharger as claimed in claim 5, wherein said bearing outer ring defines a circumferentially extending passage circumscribing said outer ring, said second portion of said lubrication passage means communicating lubricating fluid into said circumferentially extending passage, and means for communicating said lubricating fluid from said circumferentially extending passage to said bearing elements.

8. Exhaust gas driven turbocharger as claimed in claim 7, wherein said means for communicating said lubricating fluid from said circumferentially extending passage to said bearing elements includes a feed passage extending through said bearing outer ring to communicate said circumferentially extending passage with said bearing elements.

9. Exhaust gas driven turbocharger as claimed in claim 8, wherein said feed passage includes a flow restricting orifice to squirt lubricating fluid on said bearing elements at a relatively high velocity.

10. Exhaust gas driven turbocharger as claimed in claim 3, wherein said bearing outer ring includes an inner circumferential surface engaging said bearing elements and an outer circumferential surface, a circumferentially extending groove in said outer surface of said bearing outer ring circumscribing said bearing outer ring, said lubrication passage means communicating lubricating fluid to said groove, and a feed passage for communicating said lubricating fluid through said bearing outer ring from said groove to said bearing elements.

11. Exhaust gas driven turbocharger as claimed in claim 10, wherein said feed passage includes a flow restricting orifice to squirt lubricating fluid on said bearing elements at a relatively high velocity.

12. Exhaust gas drive turbocharger as claimed in claim 10, wherein said outer circumferential surface of said bearing outer ring cooperates with said housing to define a circumferentially extending intersticial space about said bearing outer race receiving a film of lubricating fluid from said groove to dampen movement of said bearing means.

* * * * *